Figure 1:
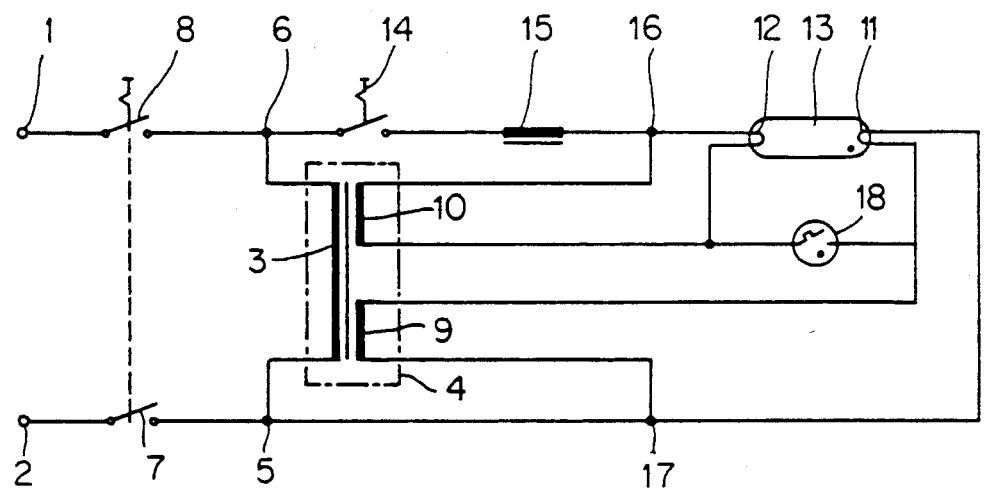

United States Patent [19]

Oppawsky

[11] Patent Number: 5,057,745
[45] Date of Patent: Oct. 15, 1991

[54] LOW-PRESSURE DISCHARGE LAMP DRIVING CIRCUIT

[75] Inventor: Steffen Oppawsky, Bad Homburg, Fed. Rep. of Germany

[73] Assignee: Heraeus Kulzer GmbH, Hanau, Fed. Rep. of Germany

[21] Appl. No.: 337,147

[22] Filed: Apr. 12, 1989

[30] Foreign Application Priority Data

Aug. 2, 1988 [DE] Fed. Rep. of Germany ....... 3826234

[51] Int. Cl.$^5$ .............................................. H05B 41/18
[52] U.S. Cl. ....................................... 315/98; 315/105; 315/DIG. 5
[58] Field of Search ......................... 315/95, 96, 98, 99, 315/105, 107, DIG. 5

[56] References Cited

U.S. PATENT DOCUMENTS 2,722,628 11/1955 Cates et al. ............................ 315/96
4,230,971 10/1980 Gerhard et al. ...................... 315/307
4,572,989 2/1986 Zuchtriegel ........................ 315/209 R

FOREIGN PATENT DOCUMENTS 0111296 9/1987 European Pat. Off. .
1764697 10/1971 Fed. Rep. of Germany .
3214515 10/1983 Fed. Rep. of Germany .

Primary Examiner—Eugene R. LaRoche
Assistant Examiner—Ali Neyzari
Attorney, Agent, or Firm—Frishauf, Holtz, Goodman & Woodward

[57] ABSTRACT

A driving circuit for a low-pressure discharge lamp, particularly a compact fluorescent lamp, features a heating transformer with two separate secondary windings, which are respectively permanently connected to the lamp electrodes, and furnish them with pre-heating current. Parallel to the primary winding of the transformer, there is connected a series circuit of an operating switch, a ballast inductor, and the discharge path formed between the lamp electrodes. The electrodes are connected to each other via a starter connected in parallel to the discharge path.

4 Claims, 1 Drawing Sheet

LOW-PRESSURE DISCHARGE LAMP DRIVING CIRCUIT

Cross-Reference to related U.S. patents, the disclosures of which are hereby incorporated by reference:
4,230,971, GERHARD et al.;
4,572,989, ZUCHTRIEGEL.

CROSS-REFERENCE TO RELATED APPLICATIONS

European Patent Application No. 83-112 266.8, published 2 Sept. '87 as publication no. EP 0 111 296, BALLMAN & KLAMT/SIEMENS AG.

The present invention relates generally to a driving circuit for a low-pressure discharge lamp and, more particularly, to such a lamp having two pre-heating electrodes which are respectively connected to separate secondary windings of a heating transformer. For power supply purposes, the primary winding of the transformer can be connected to an AC voltage source.

BACKGROUND

A number of driving circuits for low-pressure discharge lamps with pre-heating electrodes are known. European Patent Publication No. 0 111 296, September 1987, discloses a brightness control circuit for a low-pressure discharge lamp with two heating electrodes which are each connected to a secondary winding of a heating transformer 4. For brightness control, the lamp is connected via a ballast inductor 2 to a control device 3. Additionally, for stabilization of the possibly variable voltage of the control device 3, the lamp is connected to an auxiliary voltage source, which generates a high-voltage alternating current for maintaining basic ionization. Thus, a circuit arrangement composed of multiple complex modules is involved, which is relatively difficult and costly to manufacture.

THE INVENTION

It is an object of the invention to provide a circuit arrangement, for a low-pressure discharge lamp, which, in a relatively simple fashion, renders the lamp operationally ready by pre-heating of the lamp electrodes. This involves keeping the mercury lamp filling in the vapor state, and maintaining the optimal operating temperature of the phosphor layer on the inner surface of the discharge vessel.

Briefly, the present invention features a starter connected between the electrodes in parallel to the discharge path. Further, it features, connected in parallel to the transformer primary winding, a series circuit of an operating switch, a ballast inductor, and the discharge path formed between the electrodes.

For safety reasons, the primary winding of the trasnformer is preferably connected to the AC voltage source by means of a double-pole switch.

The operating switch is preferably a controllable switch having a control signal input.

If greater light intensity by grouping of lamps is desired, it is possible to provide, on the secondary side of the transformer, additional heating winding pairs for preheating of the electrodes of additional lamps. During lamp operation, the series circuits of ballast inductor and lamp are connected in parallel to the primary winding. One can actuate lighting of all the lamps by means of a single common switch, but it is also possible by means of controllable switches to actuate the lamps individually or in groups simultaneously or in sequence. Thus, for example, lamps of differing spectral ranges can be switched on or off in successive phases. This method can be used, for example, in the polymerization of light-hardened plastics.

The relatively simple structure and commercially available components of the present invention are a significant advantage; the circuit generates relatively little waste heat and, due to its low requirement for space, can be an integrated component located in the lamp housing.

DRAWING

The single figure is a schematic diagram of the lamp and driving circuit of the present invention.

An AC voltage source, indicated schematically by its terminals 1, 2, is connected via switch contacts 7, 8 to the terminals 5, 6 of the primary winding 3 of a heating transformer 4. On its secondary side, transformer 4 has two heating windings 9, 10. The winding ratio between the primary coil or winding and the secondary coil or winding is preferably between about 50:1 and about 60:1 for European use or between about 25:1 and about 30:1 for North American use. In the embodiment shown, the winding ratio is 55:1, so that a European AC voltage of 220 V on the primary side is transformed to a secondary-side voltage of 4 V. Similarly, a winding ratio of 27.5:1 would transform North American AC of 110 V to 4 V.

Secondary windings 9, 10 are each connected directly to a respective one of lamp electrodes 11, 12 of the discharge lamp 13. A starter 18 is connected between electrodes 11, 12, in parallel to the discharge path of lamp 13.

In parallel to the primary winding connected with its terminals 5, 6, there is provided the actual lamp current circuit, which comprises a switch 14, a ballast inductor 15, and the discharge path formed between electrodes 11, 12; preferably, switch 14 and ballast inductor 15 are connected between terminal 6 and a junction 16 of secondary winding 10, while terminal 5 is directly connected to junction 17 of secondary or heating winding 9.

It is possible to select, as switch 14, a controllable switch which is actuated by a control signal. Any of a number of conventional controllable switches would be suitable, so that further elaboration of this point is unnecessary.

During preparation or warm-up for operation, switch contacts 7, 8 are closed, so that both secondary windings 9, 10 furnish a pre-heating current to electrodes 11, 12. This keeps the electrodes at their operating temperature, while the mercury filling stays in the vapor state, and the phosphor coating maintains is optimal operating temperature. The respective proper operating temperatures and pressures for lamps of particular wattages are familiar to those of ordinary skill in the art. As long as switch 14 is open, no voltage is applied to the discharge path formed by lamp electrodes 11,12.

Once operating switch 14 is closed, a current flows through both lamp electrodes to starter 18. Starter 18 is a little, noble-gas-filled glow lamp, whose contacts are bridged by a bi-metallic strip. When operating switch 14 closes, the discharge of the glow lamp warms the bi-metallic strip, which flexes and breaks the circuit. Then a current limited by ballast inductor 15 flows, causing the glow discharge to cease, and permitting the bi-metallic strip to cool off again. After cooling of the noble gas in starter 18, the contact formed by the bi-metallic strip opens, so that the current loop passing through ballast inductor 15 and switch 14 is broken. This breaking of the circuit results in self-induction in the ballast, so that, in the case of an AC voltage of 220 V, a voltage pulse of about 1000 V is generated.

After ignition of lamp 13, the inductive impedance of the ballast produces such a voltage decline that a voltage of only about 100 V remains at the lamp, so that starter 18 is no longer ignited. It is also possible to provide a capacitor in parallel to the starter for spark generation.

The circuit is preferably configured as an integrated component placed in the lamp based of a U-shaped low-pressure discharge lamp, known colloquially as a "compact fluorescent". The two electrodes can be placed in the base of the lamp or in the housing of the circuit. It is also possible to provide a reflector system on the housing.

The circuit of the present invention can be used in light-polymerization in the fields of dental technology, medicine, cosmetics, and related technologies, where the polymerization space can be glare-free and open. Upon restarting, the lamp immediately produces its full rated light output.

It will be apparent to those skilled in the art that various modifications are possible within the scope of the inventive concept.

I claim:
1. A driving circuit for a low-pressure discharge lamp adapted for use in photo-polymerization with two preheatable electrodes (11,12) each directly connected to a secondary winding (9,10) of a heating transformer (4), said heating transformer having a primary winding (3) connected for power supply purposes through a power switch means (7,8) to an AC voltage source, wherein,
  there is provided, parallel to the primary winding (3), a series circuit of a ballast inductor (15), and a discharge path formed between said electrodes (11,12), and
  said electrodes (11,12) are connected to each other by a starter device (18) connected in parallel to said discharge path, and wherein
  an operating switch (14) is provided, connected in series with said ballast inductor (15), and adapted to switch ON and OFF discharge current of said lamp (13), thereby completely suppressing radiation generation during a readiness operating state.
2. The driving circuit of claim 1, wherein
  said starter device is a glow lamp (18).
3. The driving circuit of claim 1, wherein
  said operating switch (14) is a controllable switch having a control signal input.
4. The driving circuit of claim 2, wherein
  said operating switch (14) is a controllable switch having a control signal input.

* * * * *